United States Patent
Ray

(10) Patent No.: US 8,681,584 B2
(45) Date of Patent: *Mar. 25, 2014

(54) METHOD AND SYSTEM FOR TRANSMISSION OF SEISMIC DATA

(75) Inventor: Clifford H. Ray, Fulshear, TX (US)

(73) Assignee: Fairfield Incorporated, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,187

(22) Filed: Jun. 22, 2012

(65) Prior Publication Data

US 2012/0275269 A1 Nov. 1, 2012

Related U.S. Application Data

(60) Division of application No. 12/381,606, filed on Mar. 13, 2009, now Pat. No. 8,228,759, which is a continuation-in-part of application No. 11/438,168, filed on May 22, 2006, now Pat. No. 7,983,847, which is a continuation of application No. 10/719,800, filed on Nov. 21, 2003, now Pat. No. 7,124,028.

(51) Int. Cl.
*G01V 1/22* (2006.01)

(52) U.S. Cl.
CPC ................................ *G01V 1/223* (2013.01)
USPC .......................................................... 367/77

(58) Field of Classification Search
USPC .......................................................... 367/77
See application file for complete search history.

(56) References Cited

U.S. PATENT DOCUMENTS

| | | | |
|---|---|---|---|
| 1,706,066 A * | 3/1929 | Karcher | 367/77 |
| 3,886,494 A | 5/1975 | Kostelnicek et al. | |
| 4,042,905 A | 8/1977 | Fort et al. | |
| 4,042,906 A | 8/1977 | Ezell | |
| 4,072,923 A | 2/1978 | Siems et al. | |
| 4,583,206 A | 4/1986 | Rialan et al. | |
| 4,663,744 A | 5/1987 | Russell et al. | |
| 4,666,338 A | 5/1987 | Schoepf | |
| 4,815,044 A | 3/1989 | Deconinck et al. | |
| 4,823,326 A | 4/1989 | Ward | |
| 4,885,724 A | 12/1989 | Read et al. | |
| 4,908,803 A | 3/1990 | Rialan | |
| 4,914,636 A | 4/1990 | Garrotta | |
| 4,979,152 A | 12/1990 | Rialan et al. | |
| 4,992,787 A | 2/1991 | Helm | |
| 5,124,956 A | 6/1992 | Rice et al. | |

(Continued)

FOREIGN PATENT DOCUMENTS

| | | |
|---|---|---|
| GB | 2 434 718 A | 8/2007 |
| KR | 20020059876 A | 7/2002 |

(Continued)

OTHER PUBLICATIONS

Notice of Allowance dated Apr. 12, 2012 issued in co-pending U.S. Appl. No. 13/035,665.

(Continued)

*Primary Examiner* — Ian J Lobo
(74) *Attorney, Agent, or Firm* — Foley & Lardner LLP

(57) ABSTRACT

The transmission system combines a self-contained, wireless seismic acquistion unit and a wireless, line of site, communications unit to form a plurality of individual short-range transmission networks and also a mid-range, line of sight transmission network.

43 Claims, 2 Drawing Sheets

(56) References Cited

U.S. PATENT DOCUMENTS

| | | | |
|---|---|---|---|
| 5,253,223 | A | 10/1993 | Svenning et al. |
| 5,550,787 | A | 8/1996 | Rialan et al. |
| 5,623,455 | A | 4/1997 | Norris |
| 5,706,250 | A | 1/1998 | Rialan et al. |
| 5,724,241 | A | 3/1998 | Wood et al. |
| 5,822,273 | A | 10/1998 | Bary et al. |
| 6,002,640 | A | 12/1999 | Harmon |
| 6,070,129 | A | 5/2000 | Grouffal et al. |
| 6,078,283 | A | 6/2000 | Bednar |
| 6,169,476 | B1 | 1/2001 | Flanagan |
| 6,208,247 | B1 | 3/2001 | Agre et al. |
| 6,219,620 | B1 | 4/2001 | Park et al. |
| 6,226,601 | B1 | 5/2001 | Longaker |
| 6,353,577 | B1 | 3/2002 | Orban et al. |
| 6,443,228 | B1 | 9/2002 | Aronstam et al. |
| 6,549,834 | B2 | 4/2003 | McClellan et al. |
| 6,832,251 | B1 | 12/2004 | Gelvin et al. |
| 6,883,638 | B1 | 4/2005 | Maxwell et al. |
| 6,999,377 | B2 | 2/2006 | Burkholder et al. |
| 7,085,196 | B2 | 8/2006 | Nemeth |
| 7,124,028 | B2 | 10/2006 | Ray et al. |
| 7,254,093 | B2 | 8/2007 | Ray et al. |
| 7,269,095 | B2 | 9/2007 | Chamberlain et al. |
| 7,298,671 | B2 | 11/2007 | Brinkmann et al. |
| 7,310,287 | B2 | 12/2007 | Ray et al. |
| 8,296,068 | B2 | 10/2012 | Ray et al. |
| 2003/0128627 | A1 | 7/2003 | Iseli et al. |
| 2004/0121786 | A1 | 6/2004 | Radcliffe et al. |
| 2004/0252585 | A1 | 12/2004 | Smith et al. |
| 2005/0114033 | A1 | 5/2005 | Ray et al. |
| 2005/0276162 | A1 | 12/2005 | Brinkmann et al. |
| 2006/0291327 | A1 | 12/2006 | Barakat |
| 2007/0030345 | A1 | 2/2007 | Amling et al. |
| 2008/0062815 | A1 | 3/2008 | Iseli |
| 2009/0103394 | A1 | 4/2009 | Ronnow |
| 2009/0154289 | A1 | 6/2009 | Johansen |
| 2011/0242933 | A1 | 10/2011 | Maissant et al. |
| 2012/0275269 | A1 | 11/2012 | Ray |

FOREIGN PATENT DOCUMENTS

| | | | |
|---|---|---|---|
| KR | 20020094418 | A | 12/2002 |
| RU | 2091820 | C1 | 9/1997 |
| SU | 959211 | A1 | 9/1982 |
| WO | WO-2005/057237 | A2 | 6/2005 |
| WO | WO-2008/033969 | | 3/2008 |

OTHER PUBLICATIONS

Office Action dated May 3, 2012 issued in co-pending U.S. Appl. No. 13/296,329.

International Search Report, issued Mar. 24, 2011, based on PCT/US2010/027049 (5 pages).

International Preliminary Report on Patentability, issued Sep. 13, 2011, based on PCT/US2010/027049 (9 pages).

Office Action dated Apr. 1, 2013 issued in connection with U.S. Appl. No. 13/296,329.

Office Action dated Nov. 15, 2012 issued in connection with U.S. Appl. No. 13/569,990.

Office Action dated May 27, 2013 issued in connection with Canadian Application No. 2,547,062.

Final Office Action for U.S. Appl. No. 10/719,800, dated Nov. 22, 2005.

Final Office Action for U.S. Appl. No. 11/438,168, dated Feb. 5, 2008.

Final Office Action for U.S. Appl. No. 11/438,168, dated Jul. 22, 2010.

International Preliminary Report on Patentability for Application No. PCT/US04/027049 dated Feb. 22, 2006.

International Preliminary Report on Patentability for Application No. PCT/US04/030871 dated May 22, 2006.

International Search Report for Application No. PCT/US04/027049 dated Apr. 11, 2005.

International Search Report for Application No. PCT/US04/30871 dated Aug. 8, 2005.

Non-Final Office Action for U.S. Appl. No. 10/719,800, dated Apr. 15, 2005.

Non-Final Office Action for U.S. Appl. No. 10/719,800, dated Jun. 20, 2005.

Non-Final Office Action for U.S. Appl. No. 11/438,168, dated Apr. 2, 2009.

Non-Final Office Action for U.S. Appl. No. 11/438,168, dated Aug. 15, 2008.

Non-Final Office Action for U.S. Appl. No. 11/438,168, dated Jul. 5, 2007.

Non-Final Office Action for U.S. Appl. No. 11/438,168, dated Nov. 30, 2009.

Non-Final Office Action for U.S. Appl. No. 11/438,168, dated Sep. 22, 2010.

Non-Final Office Action for U.S. Appl. No. 12/381,606, dated Dec. 12, 2011.

Non-Final Office Action for U.S. Appl. No. 13/035,665, dated Oct. 24, 2011.

Non-Final Office Action for U.S. Appl. No. 13/296,329 dated Jul. 19, 2013.

Notice of Allowance dated Sep. 13, 2013 for U.S. Appl. No. 13/569,990.

Notice of Allowance for U.S. Appl. No. 13/296,329 dated Aug. 8, 2013.

US Notice of Allowance for U.S. Appl. No. 13/569,990 DTD Sep. 13, 2013.

* cited by examiner

METHOD AND SYSTEM FOR TRANSMISSION OF SEISMIC DATA

This application is a divisional of, and claims priority to, U.S. patent application Ser. No. 12/381,606, filed Mar. 13, 2009, which is a continuation-in-part of, and claims priority to, U.S. patent application Ser. No. 11/438,168 filed on May 22, 2006, now issued as U.S. Pat. No. 7,983,847, which is a continuation application of, and claims priority to, U.S. patent application Ser. No. 10/719,800, filed on Nov. 21, 2003, now issued as U.S. Pat. No. 7,124,028, all of which are incorporated herein by reference in their entirety.

BACKGROUND OF THE INVENTION

1. Field of the Invention

The present invention relates to seismic data acquisition, and more particularly to a method and system for transmitting data and control signals between multiple remote stations in an array. Most particularly, the invention relates to a seismic data collection system utilizing multiple, wireless, self-contained, seismic recording units or pods each having an associated wireless communications unit in close, but detached proximity thereto, the wireless communications unit having both short range and mid-range transmission capabilities.

2. Description of the Prior Art

Seismic exploration generally utilizes a seismic energy source to generate an acoustic signal that propagates into the earth and is partially reflected by subsurface seismic reflectors (i.e., interfaces between subsurface lithologic or fluid layers characterized by different elastic properties). The reflected signals are detected and recorded by seismic units having receivers or geophones located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Typically, the seismic units or stations are laid out in an array, wherein the array consists of a line of stations each having at least one geophone attached thereto in order to record data from the seismic cross-section below the array. For data over a larger area and for three-dimensional representations of a formation, multiple lines of stations may be set out side-by-side, such that a grid of receivers is formed. Often, the stations and their geophones are remotely located or spread apart. In land seismic surveys for example, hundreds to thousands of geophones may be deployed in a spatially diverse manner, such as a typical grid configuration where each line of stations extends for 5000 meters with stations spaced every 25 meters and the successive station lines are spaced 200 meters apart.

Various seismic data transmission systems are used to connect remote seismic acquisition units to a control station. Generally, the seismic stations are controlled from a central location that transmits control signals to the stations and collects seismic and other data, such as quality control data, back from the stations. Alternatively, the seismic stations may transmit data back to an intermediate data collection station such as a concentrator, where the data is recorded and stored until retrieved. Whichever the case, the various stations are most commonly hard wired to one another utilizing data telemetry cable. In the case of systems deployed in a marine environment, such cabling may be clad to withstand high pressure and corrosion. Commonly, cable telemetry is used for data transmission between the individual receivers, the stations and the central location. Other systems use on-board, wireless data transmission systems for communications and data transmission. Still other systems temporarily store the data at each station until the data is extracted.

In the case of wired stations, typically several geophones are connected in a parallel-series combination on a single twisted pair of wires to form a single receiver group or channel for a station. During the data collection process, the output from each channel is digitized and recorded by the station for subsequent analysis. In turn, stations are usually connected to cables used to communicate with and transport the collected data to recorders located at either a control station or a concentrator station.

In the case of wireless seismic units, each unit utilizes mid-range or long range radio transmission to communicate with either a central control station or concentrator via a transmitter on-board the seismic unit. Transmissions are made either directly between a seismic unit and the control station or directly between a seismic unit and the concentrator. To the extent the transmissions are high power, long-range signals, such as between a seismic acquisition unit and a central control station, the transmissions generally require a license from the local governing authority. Units capable of such transmissions also have higher power requirements and thus require larger battery packages. To the extent the seismic acquisition units transmit to a concentrator station utilizing a low power, mid-range signal, the transmitting and receiving units must typically have a line of site therebetween.

Those skilled in the art will understand that in order to enhance detection of seismic energy within the earth, it is necessary to maximize ground coupling between the earth and the seismic systems, and particularly the geophones of the system. Thus, it is desirable to position seismic units directly in contact with the ground and preferably, maximize the surface area of contact between the seismic unit and the ground. Moreover, it is also desirable to minimize noise that can arise from various external sources, such as wind, by minimizing the profile of the seismic unit, and specifically the height of the seismic unit as it deployed on the ground. In this regard, even an antenna projecting from the seismic unit will be subject to cross-winds and the like, thereby resulting in noise in the collected seismic energy.

One drawback to low-profile seismic units placed on the ground is that their capability of wirelessly communicating with external systems is greatly reduced, particularly if it is a line-of-sight system such as described above. This is particularly true if the seismic unit is fully or partially buried in the ground. In addition to the presence of a physical structure in the line of site between the unit and a receiver, other factors that can inhibit transmissions are a weak signal, weather conditions, topography, interference from other electrical devices operating in the vicinity of the unit, or disturbance of the unit's deployment position.

Thus, it would be desirable to provide a communication system for a seismic survey array that has flexibility in wirelessly transmitting signals and data to and from remote seismic units and a control and/or data collection station. The system should be capable of communication between functional seismic units even if one or more intermediate stations fail to operate properly. In addition, the system should be capable of communication between functional seismic units even if a change in environmental or physical conditions inhibits or prevents a direct transmission between a remote unit and its control station. The system should maximize wireless transmission capability while minimizing the possibility of noise from external sources. Similarly, the system should maximize coupling between the system and the earth.

SUMMARY OF THE INVENTION

The present invention provides a system for collecting seismic data utilizing multiple, wireless, self-contained seismic data sensor units. Each individual seismic unit is self contained such that all of the electronics are disposed within the case, including one or more geophones, a power source, a local clock and a very short range wireless transmitter/receiver. In addition, associated with each individual seismic unit is a wireless communications unit in close proximity to, but decoupled from the seismic unit, the wireless communications unit having a power source, a short range wireless transmitter/receiver for communicating with the seismic unit and a transmitter/receiver for communicating with other removed wireless systems.

Preferably, each seismic unit is disposed for burying just below the surface of the ground. In this regard, each seismic unit may be cylindrical in shape and the electronics for the seismic unit are housed in a sealed cylindrical package. Likewise, each wireless communications unit is disposed to be planted in the ground adjacent a seismic unit and project up from the ground. Each wireless communications unit is preferably formed of an elongated, rigid support structure such as a pole, shaft or the like. A low power, short range wireless transmitter/receiver is carried on the structure. At a first end of the structure is a spike or similar feature to permit the structure to be readily and easily affixed to, "planted" in or otherwise secured to the ground, while at a second end of the rigid structure is mounted a low power, mid-range, line of sight wireless transmitter/receiver. A power source may likewise be carried on or otherwise associated with the support structure.

In another embodiment, a global positioning system unit is also carried on the support structure, preferably at or near the second end.

In one embodiment of the invention, a single transceiver is utilized in place of a separate transmitter and receiver set. Moreover multiple sets of transmitters and receivers for different range transmissions may be replaced with a single transceiver with two power ranges. Such a transceiver may be utilized on the support structure rather than separate short range and mid-range transmitters/receivers, wherein a first power setting permits the transceiver to be utilized as a short range device, and a second power setting permits the transceiver to be utilized as amid-range device.

The method according to the invention transmits radio signals between individual seismic acquisition units in an array, such that the transmissions can be passed in a relay chain through the array of seismic units. The transmission between individual seismic units is enhanced by the wireless communications units of the invention. Preferably, each seismic unit is disposed in the ground so as to have a very low exposed profile. In one embodiment, each seismic unit is buried in the ground several inches below the top soil so as to have no exposed profile. A wireless communications unit is deployed in the ground adjacent each seismic unit, preferably a short distance away from the buried seismic unit. The wireless communications unit and the adjacent seismic unit communicate with one another utilizing the very short range transmission system. The wireless communications unit then communicates with other wireless communications units, satellites or other wireless receivers utilizing longer, mid-range wireless radio transmissions. The elongated length of the support structure permits the transceiver of the wireless communications unit to be raised above the ground to facilitate communicate with more remote wireless radio receivers, while the very short range transmission system permits communications between the wireless communications unit and the adjacent seismic unit.

Utilizing the seismic unit and wireless communications unit wirelessly coupled to one another, multiple seismic acquisition units within the array are capable of passing transmissions to multiple other seismic units, even if the line of site on the ground between seismic units may be inhibited. More specifically, any one seismic acquisition unit/wireless communications unit in the array is capable of transmitting radio signals to several other seismic acquisition unit/wireless communications units positioned within the line of sight, radio range of the transmitting system. A network of radio-linked seismic acquisition systems such as this permits data and control signal transmission routes back to and from a control station to be varied as desired or needed. In other words, the transmission path utilized to transmit data and control signals from and to the individual seismic acquisition systems (wherein a "system" is a single seismic acquisition unit and associated wireless communications unit) in an array may be altered. In transmissions up the chain, i.e., from the most remote seismic acquisition system to the control station, each system receives data from a seismic system "down" the chain and transmits the received data up the chain along with any data that may be locally stored on a system. Preferably, as one or more transmissions move up one or more chains, it is bounced between seismic acquisition systems so as to be relayed by each system in the array. The specific transmission path, i.e., a particular "chain" of systems, for any given transmission may vary between transmissions depending on overall requirements of the array. Control signals, such as timing signals and the like, can be passed back down the chain along the same or a different transmission path.

At least one and preferably a plurality of seismic acquisition systems in the network are located in the proximity of the control station so that the network can utilize mid-range radio frequency to transmit seismic data all the way back to the control station. In another embodiment of the invention, the control station is remotely located from the seismic systems and one or more concentrators are located in the proximity of the seismic acquisition systems of the network so that the network can utilize mid-range radio frequency to transmit seismic/QC and other data to the concentrators. The concentrators, in-turn, can store the data and/or transmit it back as desired to a control station.

Within the transmission network, there are multiple transmission paths from the most remote seismic system to the control station/concentrator. The particular transmission path to be used for any given transmission will be determined based on the strength of the signal between communicating antennas, the operational status of a seismic system and path efficiency. In this regard, it should be noted that while a seismic unit forming part of a seismic system may not be operational, its associated wireless communications unit may still function as a way point for conveying a transmission along a path since the wireless communications unit of a system operates under its own power separate from its associated seismic unit.

DESCRIPTION OF THE PREFERRED EMBODIMENTS

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
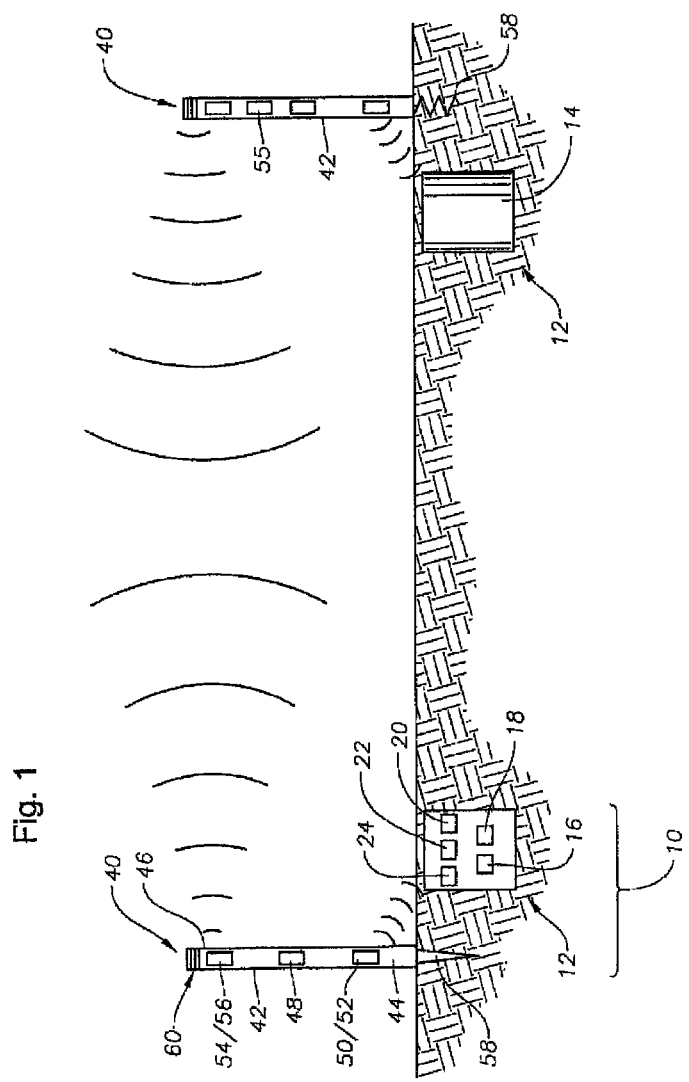
FIG. 1 is a side view of a seismic acquisition system contemplated by the invention.

With reference to FIG. 1, there is shown a seismic data acquisition system 10 comprised of a seismic data acquisition unit 12 and a low power, wireless communications unit 40. Seismic acquisition unit 12 is generally comprised of a case 14 in which is mounted a power source 16, a short-range transmitter 18, a short-range receiver 20 and at least one geophone 22. Control electronics 24, which may include long term or short term memory for storing seismic data and the like, may also be included in the case. Preferably, unit 12 is self-contained so that all electrical components are disposed within case 14, requiring no external wiring of any type. In this regard, seismic unit 12 is wirelessly linked to wireless communications unit 40 via transmitter 18 and receiver 20. Notably, while the descriptions of preferred embodiments are intended to describe a system where an external antenna is decoupled from the seismic unit 12, those skilled in the art will appreciate that seismic unit 12 may still include an internal antenna, such as may be provided for operation in conjunction with a transmitter and/or receiver chip set, for short-range communications as described herein.

Wireless communications unit 40 generally comprises an elongated support structure 42 having a first end 44 and a second end 46. Mounted on support structure 42 are electrical components, including a power source 48, a short-range transmitter 50 configured to wirelessly communicate with the short-range receiver 20 within case 14, a short-range receiver 52 configured to wirelessly communicate with the short-range transmitter 18 within said case 14, a mid-range radio transmitter 54 and a mid-range radio receiver 56.

Preferably, case 14 is cylindrical in shape so that it can easily be buried in the ground as described below. Likewise, case 14 is preferably water-tight. As such, while it is generally described for use on land, unit 14 may be deployed in wet environments and transition zone environments.

Support structure 42 is preferable an elongated rod or pole. Disposed at the first end 44 of support structure 42 is a mechanism 58 for engaging the earth. Mechanism 58 may include, but is not limited to, a spike or an auger. In other embodiments, mechanism 58 may include a cylinder or other structure that mounts in the ground and is disposed for receipt of end 44. In yet another embodiment, first end 44 of support structure 42 may be configured to engage a stake placed in the ground, such as a surveyor's stake. It is common in the industry to deploy survey stakes over a proposed area for an array prior to deployment, thereby identifying a general vicinity for deployment of a seismic unit 12. By providing a support structure 42 that can simply be engaged with a pre-deployed surveyor's stake, the time required to deploy wireless antenna 40 is reduced.

Support structure 42 may be solid, hollow or partially hollow. In one preferred embodiment, support structure 42 is a pole with a portion that is at least partially hollow for receipt of one or more of the electrical components such that the electrical components are protected from the outside environment. At the second end 46, support structure 42 may include a mechanism 60 for manipulating support structure 42, such as one or more grooves, apertures, threads or the like, thereby permitting one to manipulate support structure to permit mechanism 58 to engage the earth.

As described below, the respective mid-range transmitters/receivers of each wireless communications unit 40 communicate with each other based on line-of-sight transmission. Thus, while no particular length for support structure 42 is required for the invention, the length of support structure 42 should be of sufficient dimension to permit line-of-sight transmissions in the environment in which the wireless communications units 40 are deployed. In one embodiment, support structure 42 is approximately 3-4 feet in length.

In one preferred embodiment, mid-range radio transmitter 54 and receiver 56 are located adjacent second end 46, thereby enhancing transmission range when support structure 42 is engaged with the earth, while short-range transmitter 50 and receiver 52 are positioned nearer to first end 44, so as to be closer to the ground and closer to seismic unit 12.

One or more geophones 22 may be mounted in case 12. Geophones 22 may be single component or multi-component, i.e., capable of obtaining seismic energy in multiple axes. As used herein, the term geophone is used to refer to any device capable of detecting energy propagated through the earth, and may include, without limitation, traditional geophones, accelerometers, geophysical measuring transducers, MEMS, devices for measuring geophysical properties, and the like.

Preferably, control electronics 24 include a processor, analog board and memory. Memory may be long term, non-volatile in the event of power loss, preferably of a size or capacity to record seismic data from a series of seismic shoots over an extended period of time, such as days or weeks.

As used herein, in one embodiment, "short-range" receivers, transmitters, transceivers and transmissions are used to refer to activity in approximately the 2.4 GHz radio frequency band or otherwise used in low power, wireless personal area networks (WPANs). Those skilled in the art will appreciate that frequencies in this general range are unlicensed and generally functional over short distances of approximately 50 feet or less. Frequency hopping spread spectrum radio technology is preferably utilized in one embodiment of the invention, and in particular, wireless protocols such as the non-limiting examples of Bluetooth. In another embodiment of the invention, small, low-power digital radios based on the IEEE 802.15.4 standard for WPANs may be used, such as those based on the ZigBee standard. Systems based on the ZigBee standard are desirable because they are targeted at radio-frequency (RF) applications that require a low data rate, long battery life, and secure networking. The foregoing is preferred not only because of its short distance functionality, but also because of its low power requirements. Notwithstanding the foregoing, other short distance, low power radio systems may also be employed, such as RFID systems.

In another embodiment of the invention, "short-range" receivers, transmitters, transceivers and transmissions are used to refer to devices that uses Long Wave (LW) magnetic signals to send and receive short (~128 byte) data packets in a local regional network using IEEE 1902.1 protocol commonly called RuBee. IEEE 1902.1 RuBee uses magnetic waves, also often called inductive communication, for transmission. Additionally, RuBee uses a low frequency (~131 kHz) carrier. Although this results in a comparatively slow (~1,200 baud) transfer rate relative to other packet based network data standards, the ~131 kHz operating frequency provides RuBee with the advantages of ultra low power consumption (battery life measured in years), and normal operation near steel and/or water, thereby permitting a seismic data acquisition system as described herein to be deployed in costal transition zones and similar "wet" environments.

As used herein, "mid-range" receivers, transmitters and transmissions are used to refer to activity in approximately the 2.4 GHz radio frequency band operating under line-of-sight conditions for communicating units. Again, those skilled in the art will appreciate that frequencies in this general range are unlicensed and functional over distances of approximately one kilometer. Any standard mid-range radio transmission equipment may be utilized. One non-limiting example being wireless fidelity ("Wi-Fi") equipment, where transmission parameters may be selected to provide signal carrier modulation schemes such as complementary code keying (CCK)/packet binary convolution (PBCC) or direct sequence spread-spectrum (DSSS) or multi-carrier schemes such as orthogonal frequency division multiplexing (OFDM) and code division multiple access (CDMA).

While receivers and transmitters have been described separately herein, it will be appreciated that the foregoing may be combined in a single transceiver as is well known in the industry. As such, any reference to a transmitter and receiver pair herein may be replaced by a transceiver in accordance with the descriptions herein.

Further, a receiver, transmitter or transceiver may be provided with adjustable power ranges for transmission, and as such, can be switched between short-range transmission and mid-range transmission. In this embodiment, for example, wireless communication unit 40 may be provided with a single transceiver that can be toggled between a mid-range power setting for communicating with other wireless communication units and a low-range power setting for communicating with a seismic unit 12 wirelessly coupled to said communication unit 40.

Those skilled in the art will appreciate that the electrical requirements of wireless communications unit 40, and in particular, WPANs operating under IEEE 802.15.4 or IEEE 1902.1 RuBee standard, are much less than seismic data acquisition unit 12, and as such, the operation of wireless communications unit 40 can be accomplished with minimal power. For this reason, power source 48 may be physically very small. In one embodiment of the invention, power source 48 comprises one or more 1.5 Volt ("Double AA") batteries, a solar cell or the like.

Power savings can also be realized by placing the transmitters, receivers and/or transceivers in a low power or "sleep" mode during periods of inactivity. In one embodiment of the invention, it is contemplated that a timing signal will periodically be broadcast out to the seismic array over the mid-range network. A transceiver is maintained in a low power state except during a time window in which the timing signal is broadcast to the array. During this period or time window, the transceiver toggles to a higher power state in order to receive the timing signal. Once the timing signal has been received via the mid-range network by the wireless communication unit 40 and transmitted to its associated seismic acquisition units 12 via the short-range network, the transceiver can revert back to the low power state unil the time window for the next timing signal transmission.

Power source 48 may include a rechargeable battery. In such an embodiment, a charging system may be included as a component of power source 48. Non-limiting examples of such a charging system include systems capable of generating a charge based upon movement of the structure on which the recharging system is mounted. Thus, in the instant case, movement of the support structure 42 under wind or due to other vibrations, could be utilized to generate a power charge utilizing the recharging system. Likewise a recharging system provided in a seismic unit 12 may utilize ground vibrations or seismic energy to effectuate a charge.

Power source 16 for seismic unit 12 may be internally or externally mounted relative to case 14.

In another embodiment of the invention a global positioning system ("GPS") receiver 55 is carried by support structure 42. Location and timing information may then be conveyed to seismic unit 12 utilizing the short-range transmission network. Other timing systems may likewise be incorporated as part of wireless communications unit 40 in order to provide control signals, such as master timing signals, to seismic unit 12 via the short-range network. Such timing signals may include a periodic timing code, heartbeat or beacon signal transmitted over the network of the system. Preferably, any of the foregoing timing systems are low power in nature and capable of operating utilizing power source 48.

Figure 2:
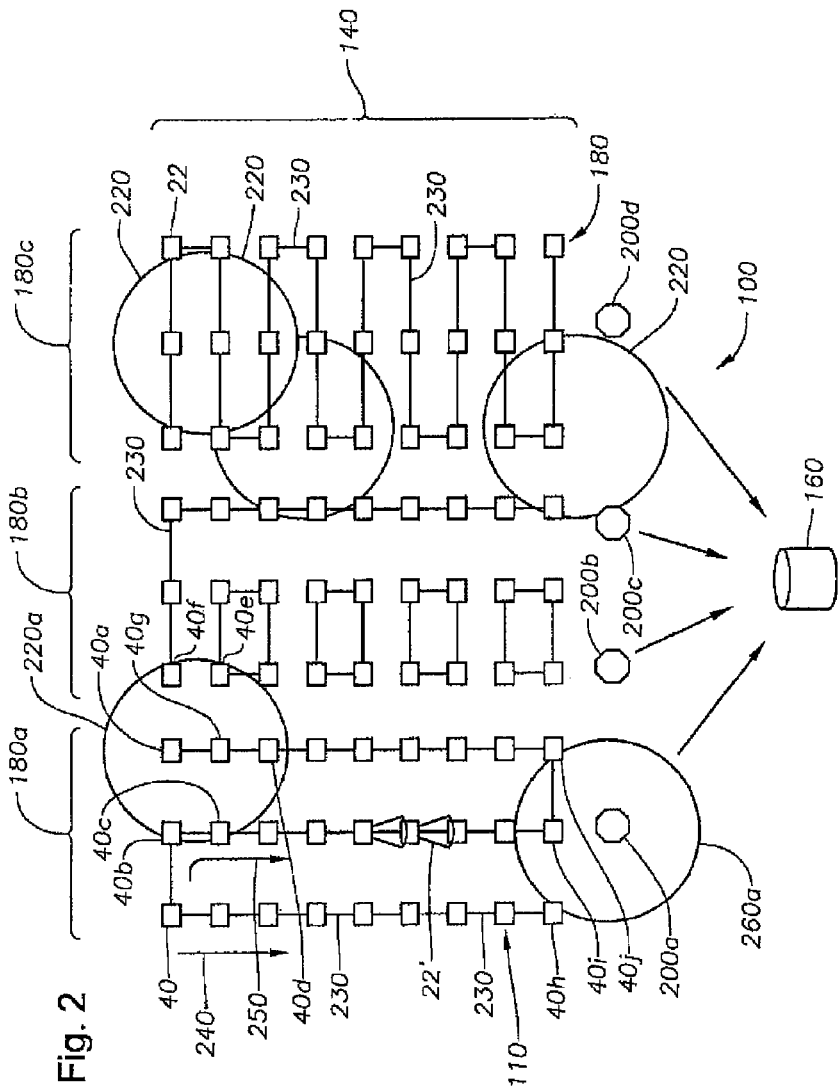
FIG. 2 is a top view of a seismic acquisition array illustrating possible transmission paths between seismic acquisition unit strings in the array.

The short range transmitters and receivers of each individual seismic data acquisition system 10 form a short-range seismic data transmission network between an individual seismic data acquistion system 10 and an associated wireless communications unit 40. Multiple seismic data acquisition system 10 can be deployed in an array, such as is shown in FIG. 2. As such, the array 100 consists of a multiplicity of short-range seimsic data transmission networks as well as an overall mid-range network formed of the transmitters and receivers of said multiple seismic data acquisition systems 10.

During deployment, each seismic unit 12 is placed in contact with the ground, forming a coupling therebetween so as to enhance seismic signal detection. Likewise, each wireless communications unit 40 is secured to the ground adjacent its respective seismic unit 12. Specifically, each wireless communications unit 40 is vertically positioned so as to protrude or project up from the ground, the unit 40 being fixed to the ground by way of engagement mechanism 58. Preferably, wireless communications unit 40 is placed sufficiently close to its seismic unit 12 so as to permit short-range transmissions therebetween, but far enough removed from seismic unit 12 so as not to cause interference with the operation of seismic unit 12. For example, such interference could take the form of movement of communications unit 40, such as by wind, that could result in the creation of unwanted seismic noise in the vicinity of the communications unit 40. In the preferred embodiment, wireless communications unit 40 is positioned within 2-5 feet of its associated seismic unit 12.

While seismic unit 12 may simply be placed on the ground, preferably it is partially or fully buried in the ground. Those skilled in the art will appreciate that by burying seismic unit 12 in the ground, not only is coupling with the ground enhanced so as to yield a better fidelity signal, but the profile of seismic unit 12 is reduced, thereby minimizing the potential for environmental interference with the operation of seismic unit 12, such as noise from wind, rain or tampering. Preferably, seismic unit 12 is fully buried in the ground, with several inches of topsoil placed over it. The short-range wireless networks disclosed herein will operate through the top soil. Soil types and soil conditions dictate the depth a seismic unit 12 can be buried and continue to communicate over the short-range network with its associated wireless communications unit 40. For example, it has been found that in wet sand, a unit 12 can be buried up to 12 inches below the surface and continue to maintain short-range contact. In either case, since seismic unit 12 has no external antenna, there is nothing protruding from seismic unit 12 that could result in noise.

In one preferred embodiment, the case 14 of seismic unit 12 is cylindrical in shape so that seismic unit 12 can be readily buried in the ground. A simple cylindrical hole need be dug in the ground utilizing any standard tool, such as an auger or a post-hole shovel. Those skilled in the art will appreciate that a round hole such as this is the most expedient and simplest to dig, especially utilizing the standard tools available, thereby reducing the labor necessary to deploy seismic unit 12.

A wireless communications unit 40 and its adjacent seismic unit 12 communicate with one another utilizing the very short range transmission system described herein. The wireless communications unit 40 then communicates with other wireless communications units 40 via mid-range, line-of-sight radio transmissions. The elongated length of the support structure 42 of each wireless communications unit 40 permits the mid-range transmitters and receivers to be raised above the surface of the ground to facilitate longer distance line-of-sight communications with other systems, while the very short range transmission system permits communications between the wireless communications unit and the adjacent seismic unit.

In one preferred embodiment, the low power, wireless communications units 40 permit the transmission of radio signals between individual seismic acquisition systems 10, i.e., a seismic acquisition unit 10 and a wireless communications unit 40, of an array, such that the transmissions can be passed in a relay chain through the array utilizing the wireless communications units 40. In other words, the transmission between individual seismic systems 10 is enhanced by the wireless communications units 40, while removing potential noise that is typically associated with antenna projecting from prior art seismic units. In another embodiment, a plurality of wireless communications units 40 can simply relay a signal without regard to, or even a need for, an associated seismic acquisition unit 12.

In yet another embodiment of the invention, each individual seismic data acquisition system 10 is comprised of a seismic data acquisition unit 12 having a short-range receiver based on IEEE 1902.1 RuBee. The associated wireless communication unit 40 is likewise provided with a short-range transmitter based on IEEE 1902.1 RuBee, along with a GPS. In this embodiment, the wireless communication unit 40 does not include any mid-range or long range transmission equipment as described herein. Rather, a timing signal is received by the GPS directly from the GPS satellite and is transmitted over the magnetic transmission network to the seismic data acquisition unit 12. This permits the seismic data acquisition unit 12 to be deployed in water or under a top layer of soil or under foliage or similar cover without sacrificing the ability to communicate with the GPS satellite, an ability that might otherwise be impeded if the GPS were mounted in the seismic data acquisition unit 12 itself. Further, such an arrangement permits the wireless communication unit 40 to be physically decoupled from the seismic data acquisition unit 12, thereby enjoying the benefits described herein.

As shown in FIG. 2, in the foregoing transmission method, a transmission network 100 is comprised of a plurality of seismic acquisition systems 110 spread out in a seismic array 140 and controlled by control station 160. Each acquisition system 110 is comprised of a seismic data acquisition unit 10 and a low power, wireless communications unit 40. Array 140 is formed of multiple lines 180 of acquisition systems 110. Radio transmissions, and in particular, seismic data, quality control data, timing signals and/or control signals, are passed from wireless communications unit 40 to wireless communications unit 40 as the transmission is bounced through the network 100 to or from control station 160. In one embodiment of network 100, concentrators 200 are disposed between array 140 and control station 160. While the invention will be described in more detail with references to transmission of timing signals out to the network from a control station 160, those skilled in the art will understand that the invention encompasses any type of transmissions to or from a seismic unit, including, without limitation, control transmissions, seismic data or quality control data.

With respect to the timing signal, it is contemplated that a timing signal will be broadcast to the array periodically during time windows so as to permit the seismic acquisition units 12 to be synchronized with a master clock. By utilizing such a synchronization method, low power, low cost, temperature compensated crystal oscillators can be utilized as the local timing device in the individual seismic units 12, thereby reducing cost and power requirements for the seismic units 12.

Each wireless communications unit 40 preferably has an omnidirectional transmission range 220 and can form a wireless link 230 with multiple communications units 40. As shown, within the transmission range 220 of a unit 40, there are multiple other communications units 40 capable of receiving the transmission, in essence forming a local area network comprised of mid-range wireless communications units 40. For example, unit 40*a* has an omnidirectional transmission range 220*a*. Falling within the transmission range 220*a* of communications unit 40*a* are communications units 40*b*-40*g*. With the flexibility to transmit to multiple communications units 40 each having the ability to receive and transmit seismic data to multiple other communications units 40 within the array 140, each communications unit 40 within array 140 is presented with multiple paths for communicating seismic data back to control station 160. For example, communications unit 40' can transmit seismic or QC data back to control station 160 by sending it along path 240, along path 250 or along some other path as determined by the requirements of network 100. Likewise, a timing signal can be sent along the same or different paths to communications unit 40' from control station 160.

In another embodiment, a transmitting communications unit 40 may utilize directional transmitter such that transmissions are substantially unidirectional and made only to one or more communications units 40 in a limited direction. It is common in the art to utilize phased antenna arrays—an array consisting of two or more antenna to achieve transmission directionality and gain improvement. In these types of antenna arrangements, various adjustable antenna parameters, such as phase, can be altered to control directionality and gain, and hence, transmission range. Thus, for purposes of this description, "unidirectional" means a transmission with a higher gain along one axis or in a limited direction, whereas "omni-directional" means a transmission with generally the same gain in substantially 360°. This will maintain the flexibility to transmit to multiple communications units in the direction the transmitting antenna is pointed, while reducing the number of path options that need to be processed by the overall system, thereby multiple paths to be transmitted on the same frequency at the same time without interfering with one another. In addition, a higher gain in a single or limited direction can be achieved without the need for additional power, or alternatively, power requirements can be decreased, and thus battery life extended, while maintaining the same gain as an omnidirectional signal.

In the illustration of FIG. 2, array 140 is shown as being comprised of three seismic acquisition system strings 180*a*, 180*b*, and 180*c*. Each string 180*a*, 180*b*, and 180*c* illustrates a different potential transmission path defined by wireless links 230 between the wireless communication units 40 within a string. Those skilled in the art will understand that the indicated wireless links 230 are for illustrative purposes only and, for purposes of the invention, a "string" 180 of seismic acquisition systems 110, and hence corresponding communications units 40, for a particular transmission path is defined by the selected transmission path by which data is communicated from one unit 40 to another. Thus, for any given array 140, a "string" of units may be constantly changing between transmissions. Such an arrangement permits transmissions to be rerouted in the event of some failure of a unit 40 within the string. Likewise, transmissions can be rerouted in the event of a weak signal between units 40 or to overcome topographic or other obstacles that could interfere with short range, line of site transmissions. Furthermore, in addition some failure of a unit 40, it may be desirable to reroute a transmission simply because of the operational status of a unit. For example, a unit 40 with lower battery power may be utilized downstream at the end of a string and avoided as a transmission relay further upstream in order to conserve the unit's batteries, i.e., upstream relay units require more power to relay the transmission because of the cumulative size of the transmissions.

In the event multiple adjacent strings are desired, radio transmission parameter assignments may be made to minimize interference with other transmissions and permit reuse of the same transmission parameters. For example, string 180*a* may transmit data at a first set of radio transmission parameters while string 180*b* may transmit data at a second set of parameters. Since the transmissions from a sting 180 are short range, it may only be necessary for adjacent strings to utilize different transmission parameters, depending on the array spread. In this regard, the physical seismic unit layout of a portion of array 140 defined as a string 180 may be dependent on the mid-range transmission capabilities of the communications units 40 in the adjacent string. Non-adjacent strings utilizing the same string are sufficiently spaced apart so as not to interfered with one another. In other words, string 180*b* is defined such that its width is sufficient to ensure that any transmission from an communications unit 40 from string 180*a* transmitting with a certain set of radio transmission parameters will not be received by any communications unit 40 from string 180*c* set to receive transmissions using the same set of radio transmission parameters. Those skilled in the art will understand that there are many transmission parameters that can be adjusted in this regard, including the non limiting examples of frequencies, time slots, power, methods of modulation, directional antenna gain, physical spacing of units and strings, etc.

Furthermore, while three strings 180 are depicted to indicate possible transmission paths, system 100 can comprise any number of strings. The number of strings for any given group of transmissions is dependent on the system requirements. For example, rather than multiple strings, each communications unit 40 in an array 140 may be utilized in a single transmission path such that the entire array 140 might be considered a "string" for purposes of the description. Those skilled in the art will understand that the number of transmission paths and the number of acquisition units utilized for any given transmission may constantly be influx to maximize the operation requirements for a particular transmission or group of transmissions.

In one preferred embodiment, the transmitted signal strength of a wireless communications unit 40 can be altered to adjust the transmission range for a transmitting communications unit 40 such that number of potential receiving communications units 40 can be controlled. In this regard, rather than utilizing multiple transmitter/receivers within an individual network for short and mid-range transmission, communications unit 40 may have a single transmitter/receiver that can be toggled between a short-range transmission power and mid-range transmission power.

At least one and preferably a plurality of seismic acquisition systems 110 in network 100 are proximately located to control station 160 so that network 100 can utilize mid-range radio frequency to transmit timing signals from control station 160 to the seismic acquisition systems 110. Alternatively, data may be transmitted from the seismic acquisition systems 110 to control station 160. In one embodiment, a plurality of wireless communications units 40 can simply relay a signal to control station 160 without regard to, or even a need for, an associated seismic acquisition unit 12. In another embodiment of the invention, data is accumulated and stored at multiple, dispersed concentrators 200 remote from control station 160. Concentrators 200 are located in the proximity, i.e., line-of-sight, of the communications units 40 of the network 100 so that the network 100 can utilize low power, mid-range radio transmission to transmit data to the concentrators 200. The concentrators 200, in-turn, can store the data or transmit it back as desired to control station 160. In one embodiment, concentrators locally store seismic data but transmit quality control data received from the acquisition units back to control station 160. Likewise, concentrators 200 may be used as way-points in the transmission of control and timing signals out to the network 100.

Much like the individual communications units 40, each concentrator 200 preferably also has a transmission range 260 that encompasses several wireless communications units 40. As within the array 140, transmission of data from a string 180 to the concentrator 200 may be made from a plurality of units 40. For example, concentrator 200*a* has an omnidirectional transmission range 260*a*. Falling within the transmission range 260*a* of concentrator 200*a* are wireless communications units 40*h*-40*j*. As such, any of wireless communications units 40*h*-40*j* may transmit seismic data from string 180*a* to concentrator 200*a*. Thus, a failure of one of the communications units, such as 40*h*, would not prevent data from string 180*a* from being passed up the line or communications signals from being passed down the line. Rather, the transmission path from string 180*a* to concentrator 200*a*, or vice-versa, would simply be rerouted through an operative communications unit, such as units 40*i* or 40*j*. Concentrators 200 may also be positioned so as to be within the mid-range transmission distance of adjacent concentrators.

As described above, network 100 can function either as a one-way network, i.e., concentrators 200 are utilized only to receive data transmitted from array 140 or concentrators 200 are used to transmit a timing or control signal out to array 140, or a two-way network, i.e., concentrators 200 transmit command signals out to array 140 in addition to receiving data transmitted from array 140.

Transmissions to control station 160 from concentrators 200 or communications units 40 may also include GPS or other survey information to establish the location of a particular unit 12 for purposes of the shot and for purposes of retrieval. This is particularly desirable for wireless units as described herein since it may be difficult to locate such units upon retrieval. GPS survey information may also be useful in selection of a transmission path within an array as described above.

In operation, a preferred transmission path may be preset in units 40 or predetermined. Likewise, alternate transmission paths may be preset in units 40 or predetermined. These preset paths, as well as the number of paths required for a particular array 140, are determined based on the volume of the data to be transmitted, the data transmission rates, signal strength and the number of "real time" radio channels having different transmission parameters such that the radio transmission channels are non-interfering, battery power, location of the unit, etc.

Prior to a transmission or a set of transmissions along a string, a beacon signal may be utilized to verify the preferred transmission path in much the same way as an ad hoc network or peer to peer network identifies systems within the network. Alternatively, rather than transmitting utilizing a preset or predetermined path, the beacon signal may be used to establish a transmission path utilizing the above described parameters. If a beacon signal is transmitted and the preferred transmission path is not available, system 100 will search for another transmission path through the wireless communication units. In one embodiment, the beacon signal is transmitted and the local wireless communications units within range send a return signal acknowledging their receipt of the beacon signal. Once a path is verified or established, as the case may be, the path may be "locked in" for purposes of the particular transmission so that system 100 will not continue searching for another path. The beacon signal may be generated from within the array 140 by the seismic unit systems themselves or initiated by the control station or concentrator.

As mentioned above, one benefit of the invention is the ability to utilize flexible transmission paths that can be readily changed based on various internal and external parameters effecting the network. This flexability also renders the network itself much more reliable. Preferably, transmission paths can be established and/or rerouted on-the-fly based on these parameters. Another advantage of the system is that it utilizes less power in transmitting a signal over a given distance via multiple short transmissions than would be required of a single transmission over the same distance. In other words, because the power required to transmitt a signal decreases as one over the square of the transmission distance, it is much more optimal to transmit a signal in several short hops than it would be to transmit the same signal over the same distance in a single hop. This is true even of low power, mid-range transmissions. Of course an additional advantage of the system of the invention is that it may avoid the need to acquire high power radio transmission licenses. Finally, unlike the prior art, the system of the invention eliminates the need to physically locate a concentrator or similar device in the middle of a seismic array, nor utilize the concentrator to sort and organize multiple seismic data transmissions incoming directly from individual seismic acquisition systems.

Turning back to the individual seismic acquisition units as illustrated in FIG. 1, each seismic unit 12 is preferably wireless and requires no external cabling for data transmission, timing or unit control. Each seismic unit 12 may contain a power source 16, such as a battery, a short-range radio transmitter/receiver 18/20, control electronics, which may include, without limitation, a local clock, local memory for storing seismic data, and a processor housed within a casing 14. A geophone package 22 may be housed within the casing 14 or externally attached thereto. Further, because the unit 12 need only transmit a short range signal, power requirements for the unit are minimized, in contrast to the increased power requirements necessary to transmit a stronger signal to a more distant receiving device. By reducing the memory requirements, the transmission requirements and the battery requirements, the overall cost, as well as the physical size and weight, of each unit is minimized.

While certain features and embodiments of the invention have been described in detail herein, it will be readily understood that the invention encompasses all modifications and enhancements within the scope and spirit of the following claims.

The invention claimed is:

1. A transmission method for seismic data acquisition units, said method comprising the steps of:
   A. Providing a self-contained wireless seismic acquisition unit, said seismic acquisition unit comprising a casing; a power source for said seismic acquisition unit within said casing; a transceiver with short-range transmission capabilities disposed within said casing such that no portion of the transceiver module extends beyond said casing; and a geophone;
   B. Providing a wireless transmission communications unit comprising an elongated support structure having a first end and a second end; a power source for said communications unit, wherein one of the first end or the second end is mounted in the ground surface a distance from the casing such that the communications unit does not interfere with the seismic acquisition unit; a transceiver with short-range transmission capabilities mounted on said support structure and configured to wirelessly communicate with the short-range transceiver within said casing; and a radio transceiver with mid-range transmission capabilities mounted on said support structure;
   C. Deploying said self-contained wireless seismic acquisition unit at a desired location fully buried in the ground;
   D. Deploying said communications unit adjacent to said seismic acquisition unit, wherein a distance that the elongated support structure is mounted in the ground surface from the casing is sufficient to permit short-range transmissions between the short-range transmitter in the communications unit and the short-range receiver module in the seismic acquisition unit;
   E. Wirelessly coupling said seismic acquisition unit and said communications unit to create a short-range transmission network therebetween;
   F. Receiving a control signal over a mid-range radio network utilizing said mid-range radio transceiver mounted on said support structure; and
   G. Transmitting the control signal between said communications unit and said seismic unit utilizing said short-range transmission network.

2. The method of claim 1, further comprising the steps of:
   repeating steps A-F for at least three spaced apart seismic acquisition units and associated communications units deployed in an array, wherein each of said communications units is capable of receiving a mid-range radio transmission and transmitting a mid-range radio transmission;
   providing a transmission station for communicating via a mid-range radio transmission with at least one communications unit within said array;
   subsequent to deployment, identifying at least two separate transmission paths between the transmission station and a communications unit, wherein a transmission path is defined as a chain of at least two communications units and the transmission station, each capable of communicating in series via mid-range radio transmission;
   selecting a transmission path from among the identified transmission paths based on a set of transmission path criteria; and transmitting a mid-range radio signal along said selected transmission path.

3. The method of claim 1, further comprising the steps of:
   repeating steps A-F for a plurality of spaced apart seismic acquisition units and associated wireless communications units deployed in an array, wherein each of said wireless communications units is capable of receiving a mid-range radio transmission and transmitting a mid-range radio transmission and wherein each of said seismic acquisition units is capable of acquiring seismic data;

utilizing at least two of said wireless communications units to transmit a control signal via mid-range radio transmission to another communications unit in the array;

utilizing at least two of said wireless communications units to receive a control signal via mid-range radio transmission from another wireless communications unit in the array;

partitioning said plurality of wireless communications units and associated seismic acquisition units into at least two sub-sets of units; and using a mid-range radio transmission technique having parameters set so that non-interfering radio transmission may be effected in each sub-set.

4. The method of claim 1, wherein the step of deploying said self-contained wireless seismic acquisition unit comprises burying said seismic acquisition unit in the ground below the surface of the ground.

5. The method of claim 1, wherein the step of deploying said communications unit adjacent to said seismic acquisition unit comprises the step of engaging the first end of said elongated support structure with the ground such that said support structure projects up from the ground.

6. The method of claim 1, wherein the step of deploying said communications unit adjacent to said seismic acquisition unit comprises the step of engaging the first end of said elongated support structure with the ground and orienting said support structure to be substantially vertical relative to the ground.

7. The method of claim 2, further comprising the step of transmitting a first signal along one transmission path and transmitting a second signal along the other transmission path.

8. The method of claim 1, wherein said control signal is a timing signal, said method further comprising the steps of utilizing said control signal transmitted to the seismic unit to discipline a local clock of said seismic unit based on a master control clock.

9. The method of claim 1, wherein said control signal is a timing signal, said method further comprising the steps of utilizing said control signal transmitted to the seismic unit to time stamp seismic data acquired by said seismic unit.

10. The method of claim 1, wherein the radio transceiver with mid-range transmission capability also has short-range transmission capability.

11. The method of claim 10, said method further comprising the step of toggling the transceiver between mid-range transmission capability and short-range transmission capability.

12. The method of claim 1, wherein at least two wireless communication units fall within the mid-range radio transmission range of another wireless communication unit.

13. The method of claim 1, wherein at least two seismic acquisition units fall within the short-range transmission range of a wireless communication unit.

14. The method of claim 6, wherein the radio transmission range of at least one of the wireless communication units is omnidirectional.

15. The method of claim 6, wherein the radio transmission range of at least one of the wireless communication units is unidirectional.

16. The method of claim 1, further comprising the steps of:

repeating steps A-F for a plurality of spaced apart seismic acquisition units and associated communications units deployed in an array, wherein each of said communications units is capable of receiving a mid-range radio transmission and transmitting a mid-range radio transmission;

subsequent to deployment, identifying at least two separate transmission paths from a first point to a second point in the array from among the plurality of wireless communications units, wherein a transmission path is defined as a chain of at least three communications units, each capable of communicating in series via mid-range radio transmission;

selecting a transmission path from among the identified transmission paths based on a set of transmission path criteria; and transmitting a mid-range radio signal along said selected transmission path.

17. The method of claim 16, wherein said transmission chains include each wireless communication unit in the array.

18. The method of claim 1, further comprising the step of adjusting the transmission range of a wireless communication unit so as to alter the number of other wireless communication units within radio transmission range of the adjusted wireless communication unit.

19. The method of claim 2, wherein said transmission station is within mid-range radio range of at least two wireless communication units.

20. The method of claim 2, wherein said transmission station is within mid-range radio range of at least three wireless communication units.

21. The method of claim 2, wherein a transmission station receives seismic data from said seismic acquisition units and said seismic data is transmitted over the same transmission chain utilized to transmit control signals to said seismic acquisition units from the transmission station.

22. The method of claim 2, wherein a transmission station receives seismic data from said seismic acquisition units and said seismic data is transmitted over a different transmission chain than that utilized to transmit control signals to said seismic acquisition units from the transmission station.

23. The method of claim 2, wherein the transmissions between said seismic acquisition units and the transmission station are made utilizing different transmission chains.

24. The method of claim 1, further comprising the steps of transmitting quality control data from a seismic acquisition unit to its associated wireless communication unit over the short-range network established therebetween and subsequently transmitting said quality control data from the wireless communication unit to another wireless communication unit over the mid-range network established between a plurality of wireless communication units in the array.

25. The method of claim 2, wherein said transmission path is preset among the wireless communication units.

26. The method of claim 25, wherein a second alternate transmission path is preset among the wireless communication units.

27. The method of claim 2, wherein multiple transmission paths are identified.

28. The method of claim 27, further comprising the step of selecting a transmission path among the multiple transmission paths prior to transmitting.

29. The method of claim 1, further comprising the step of determining the number of other wireless communication units within mid-range transmission range of a wireless communication unit.

30. The method of claim 1, further comprising the step of determining the signal strength for other wireless communication units within transmission range of a wireless communication unit.

31. The method of claim 2, further comprising the step of generating a beacon signal and transmitting the beacon signal along the transmission path.

32. The method of claim 2, further comprising the step of verifying the transmission path by generating a beacon signal.

33. The method of claim 31, further comprising the step of utilizing said beacon signal to establish a synchronized recording time among the seismic acquisition units.

34. The method of claim 31, further comprising the step of simultaneously initiating recording of seismic data by said seismic acquisition units.

35. The method of claim 21, wherein seismic data transmitted from a seismic acquisition unit is time stamped prior to transmission.

36. The method of claim 1, wherein said short-range transmission network utilizes IEEE 1902.1 protocol.

37. The method of claim 1, wherein said short-range transmission network operates in the 2.4 GHz radio frequency band.

38. The method of claim 8, wherein said step of disciplining is repeated on a period basis as the seismic unit is acquiring seismic data.

39. The method of claim 9, wherein said step of time stamping is repeated on a period basis as the seismic unit is acquiring seismic data.

40. A method for transmission of control signals among an array of seismic data acquisition units, said method comprising the steps of:
   A. Establishing a plurality of short-range transmission networks within a seismic data acquisition unit array, wherein each short-range transmission network is comprised of
      a self-contained wireless seismic acquisition unit having a casing that is fully buried below a ground surface;
      a power source for said seismic acquisition unit within said casing;
      a short-range radio transmission transceiver completely disposed within said casing such that no portion of the short-range transmission transceiver extends from said casing;
      a geophone disposed within said casing and
   a wireless communication unit positioned in close proximity to said seismic data acquisition unit, said wireless communication unit having an elongated support structure having a first end and a second end and where one of the first end or the second end is mounted in the ground surface at a distance from the casing such that the communications unit does not interfere with a respective seismic acquisition unit;
      a power source for said communications unit separate from said acquisition unit;
      a radio transceiver mounted on said support structure and configured in a first state to wirelessly communicate with the short-range radio transceiver within said casing, wherein a distance that the elongated support structure is mounted in the ground surface from the respective casing is sufficient to permit short-range transmissions between the radio transceiver mounted on said support structure and the short-range transmission transceiver in the seismic acquisition unit; said transceiver further configured in a second state to transmit and receive mid-range radio transmissions;
   B. Transmitting a timing signal between a plurality of mid-range radio transceivers each mounted on a support structure via a mid-range radio network; and
   C. Transmitting the timing signal to a seismic unit from a wireless communication unit via the short-range transmission network.

41. The method of claim 40, comprising:
Deploying the self-contained wireless seismic acquisition unit;
Deploying a plurality of wireless communication units, the plurality of wireless communication units comprising the wireless communication unit and a second wireless communication unit;
Establishing a wireless magnetic transmission network between the wireless communication unit of the plurality of wireless communication units and the self-contained wireless seismic acquisition unit utilizing Long Wave (LW) magnetic signals; and
Establishing a wireless radio transmission network between the wireless communication unit and the second wireless communication unit utilizing radio signals.

42. The method of claim 41, further comprising:
Receiving, by the wireless communication unit, a timing signal over a radio transmission network; and
Transmitting, by the wireless communication unit, the received timing signal over the magnetic transmission network to the self-contained wireless seismic acquisition unit.

43. The method of claim 42, comprising:
Receiving, by the wireless communication unit a GPS timing signal from a GPS satellite; and
Transmitting, by the wireless communication unit, said GPS timing signal to the self-contained wireless seismic acquisition unit utilizing said wireless magnetic transmission network.

\* \* \* \* \*